United States Patent [19]

Koto

[11] 4,364,066

[45] Dec. 14, 1982

[54] INK JET PRINTING HEAD

[75] Inventor: Haruhiko Koto, Shiojiri, Japan

[73] Assignees: Shinshu Seiki Kabushiki Kaisha, Nagano; Kabushiki Kaisha Suwa Seikosha, Tokyo, both of Japan

[21] Appl. No.: 189,461

[22] Filed: Sep. 22, 1980

[30] Foreign Application Priority Data

Sep. 21, 1979 [JP] Japan .............................. 54-121621

[51] Int. Cl.³ .............................................. G01D 15/18

[52] U.S. Cl. .............................................. 346/140 R

[58] Field of Search .......................... 346/1.1, 75, 140

[56] References Cited

U.S. PATENT DOCUMENTS 3,747,120 7/1973 Stemme ................................ 346/75
3,946,398 3/1976 Kyser et al. ............ 346/140 PD X
4,024,544 5/1977 Vernon ................................ 346/1.1
4,229,751 10/1980 Tamai .......................... 346/140 PD

FOREIGN PATENT DOCUMENTS 54-148531 11/1979 Japan ............................ 346/140 PD
1416980 12/1975 United Kingdom .

*Primary Examiner*—Donald A. Griffin
*Attorney, Agent, or Firm*—Blum, Kaplan, Friedman, Silberman and Beran

[57] ABSTRACT

An ink jet printing head of simple construction includes two supply channels and a pressure chamber which are substantially coplanar with the nozzle. A piezoelectric element acts to decrease the pressure chamber volume and eject an ink droplet from the nozzle. A smoothly curved supply channel inlet assures that vapor in the pressure chamber is easily removed. Ink refills the pressure chamber from a transverse supply pipe feeding two supply channels when the chamber volume increases after ejection of a drop.

16 Claims, 8 Drawing Figures

INK JET PRINTING HEAD

BACKGROUND OF THE INVENTION

This invention relates generally to an ink jet printing head of the type used to project drops of ink on a printing media for printing and more particularly to an ink jet printing head using a piezoelectric element to change the volume of a pressure chamber so as to eject an ink drop from a nozzle. Many methods to provide an ink-on-demand type ink jet printer had been proposed in the prior art but these generally present large resistance to flow within the fluid channels and thus need a long period of time to make up for ejected ink. Also many of these printer head designs require critical dimensioning of flow passages and there is difficulty in purging vapors from the flow passages once they have entered or formed in the printing head.

What is needed is an ink jet printing head which supplies ink on demand, is readily purged of internal vapors which may accumulate, has a short refill time, and is of simple construction.

SUMMARY OF THE INVENTION

Generally speaking, in accordance with the invention, an ink jet printing head especially suitable for rapid printing and of simple construction is provided. The ink jet printing head of this invention includes two supply channels and a pressure chamber which are substantially coplanar with the nozzle. A piezoelectric element acts through a vibration plate to decrease the pressure chamber volume and eject an ink drop from the nozzle. The vapor in the pressure chamber is easily removed as a result of a smooth coplanar construction and ink refills the pressure chamber from a transverse supply pipe feeding the supply channels when the chamber volume increases after ejection of an ink drop. The supply channels feed make-up ink adjacent to the nozzle and also to the pressure chamber at a point opposite to the nozzle.

Accordingly, it is an object of this invention to provide an improved ink jet printing head having a simple construction which readily permits discharge of vapor generated in the head.

Another object of this invention is to provide an improved ink jet printing head having few components which are easily manufactured and assembled.

A further object of this invention is to provide an improved ink jet printing head having few critical dimensions.

Still another object of this invention is to provide an improved ink jet printing head which allows for quick make-up of ejected ink and can operate at high speed.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Many means to produce an ink-on-demand type ink jet printer have been proposed or developed in the prior art, for example, the Kyser apparatus shown in U.S. Pat. No. 3,946,398, the Stemme apparatus shown in U.S. Pat. No. 3,747,120 and the device disclosed in U.S. Pat. No. 4,024,544 by Vernon.

Figure 1:
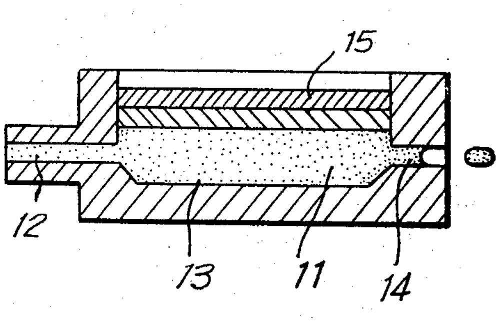
FIG. 1 PRIOR ART
FIGS. 1 through 4 are cross sectional views of ink jet printing heads of the prior art.

In the ink jet printing head of Kyser as shown in FIG. 1, ink 11 passes through an inlet channel 12 to fill a pressure chamber 13. Ink flows from the pressure chamber 13 to a nozzle 14. A piezoelectric pressure plate 15 comprises one side wall of the pressure chamber 13 and deflection of the pressure plate 15 causes ink 11 to be ejected from the nozzle 14. However, this configuration has a high resistance to fluid flow in the channel 12 and a long time is required to make up the amount of ejected ink in the pressure chamber 13. The ink 11 is not in a coplanar chamber and passages.

Figure 2:
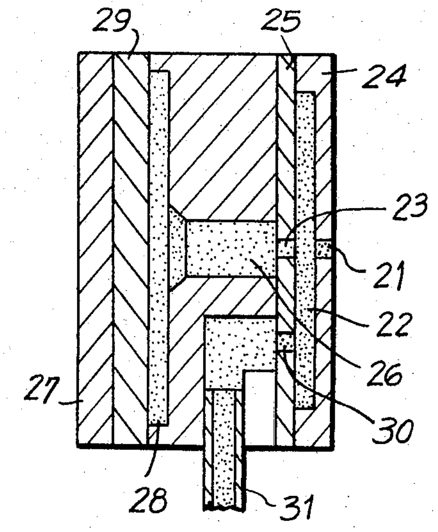
FIG. 2 PRIOR ART

In the ink jet printing head of Stemme as shown in FIG. 2, an outer chamber portion 22 is positioned adjacent to a discharge channel 21 so that the time to make-up for ejected ink is shortened. Ink is also contained in an inner pressure chamber 26 which has an outlet connecting channel 23 positioned in a dividing plate 25 in alignment with the discharge channel 21. An inlet channel 30 feeds ink from an external source 31 into the outer chamber 22. A metal plate 29 is positioned against a wall 28 of the inner chamber 26 and a piezoelectic crystal 27 is affixed to the metal plate 29 to deflect the plate for the purpose of ejecting droplets from the discharge channel 21.

However, this construction is difficult to produce in that there is a pair of plates 24, 25 each having an aperture with a diameter in the order of 50 microns. Further, these plates 24, 25 must be positioned with a precisely dimensioned space between them and with the apertures directly opposite and axially aligned with each other. Moreover, it is extremely difficult to discharge any vapor which may be generated or sucked into the inner pressure chamber 26. When vapor is generated in the inner pressure chamber 26, the deflection of the piezoelectric crystal 27 is used for compression of the vapor rather than for pressurizing the ink in the chambers. Therefore, when vapor is present printing is impossible.

Figure 3:
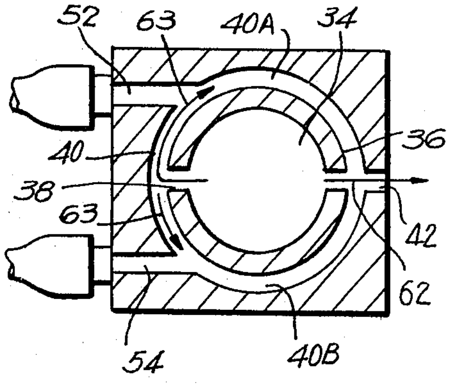
FIG. 3 PRIOR ART
Figure 4:
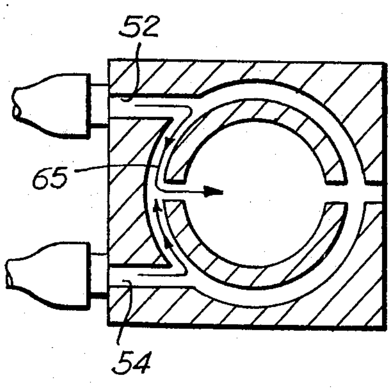
FIG. 4 PRIOR ART

The ink jet printing head in accordance with Vernon is shown in FIGS. 3 and 4. An inner ink pressure chamber 34 has one planar wall comprised of a piezoelectrically driven surface, such that when the volume of the chamber 34 is reduced by action of the piezoelectric element, a droplet of ink is ejected from a nozzle 42. An annular partition surrounding the inner chamber 34 produces a dampening channel 40 which is open in two places 36, 38 in alignment with the discharge nozzle 42.

When the volume of the pressure chamber 34 is reduced by action of the piezoelectric element (not shown), a pressure front passes through the channels in the directions of the arrows 62, 63 shown in FIG. 3. The pressure front, as shown by the arrow 62, effects an ejection of an ink droplet from the nozzle 42. Also the pressure front, as shown by the arrows 63 travels through the meniscus dampening channels 40*a*, 40*b* and arrives in the vicinity of the nozzle 42 at substantially the same instant that the ink droplet leaves the nozzle 42. Arrival of the pressure front through the dampening channels 40 substantially dampens the full period of meniscus vibration which otherwise would occur.

When the volume of the pressure chamber 34 is restored to its original dimensions by an unflexing of the piezoelectric element, ink is supplied to the chamber 34 through fluid supply channels 52, 54 as shown by the arrow 65 in FIG. 4. Because the next ink drop cannot be reliably ejected from the nozzle 42 until vibrations in the meniscus are dampened, the speed of operation of the printing head is increased to high levels by dampening the meniscus vibration in the vicinity of the nozzle 42 as described above.

However, in the apparatus of FIGS. 3 and 4, it is necessary that the pressure front as indicated by the arrows 63 arrives in the vicinity of the nozzle 42 at substantially the same instant that the droplet leaves the nozzle 42. Therefore, the length of the meniscus dampening channels 40*a*, 40*b*, must be narrowly defined. There are other structural limitations regarding the shape of the channels. In particular, the cross-section area of the supply channels 52, 54 needs be larger than the meniscus dampening channels 40. Also, the port 38 opposite to the nozzle 42 should be larger than the port 36 also opposite the nozzle 42. The port 38 is preferably connected at right angles to the meniscus dampening channel 40. Finally, the angle of approach of the supply inlet channels 52, 54 to the meniscus dampening channel 40 is such that the pressure front in the channel 40 will substantially pass through the branches 40*a*, 40*b* without a significant pressure drop.

To provide the proper angle of approach to the supply inlet channels 52, 54 means that these channels do not align in the same row with the nozzle 42 and channels 36, 38. Thus, two fluid supply channels rather than one are needed. When vapor is generated in the pressure chamber 34 and ink is supplied from an external source by applying pressure to the ink, the ink passes through the dampening channels 40*a*, 40*b*. As a result, little ink in the pressure chamber 34 flows out and vapor in the pressure chamber 34 is not discharged but remains trapped therein. As stated above, such a condition results in vapor compression by the piezolelectric element and printing is not possible.

It is an object of the present invention to provide an inexpensive head for an ink jet printer which operates at high speed, is easy to produce and expels vapor.

Figure 5:
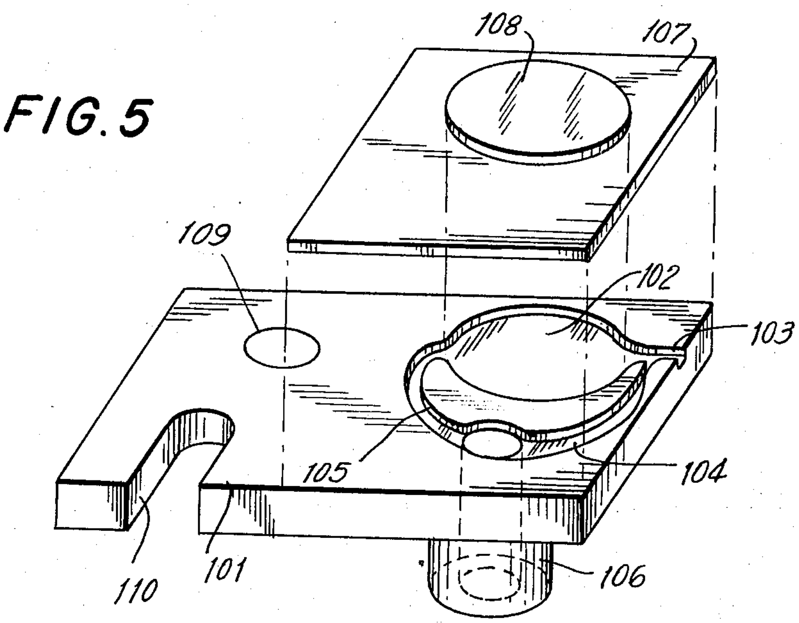
FIG. 5 is an exploded perspective view of an ink jet printing head in accordance with this invention.

FIG. 5 is a perspective view of an ink jet printing head in accordance with this invention. A baseplate 101 is made from a corrosion-proof plastic material such as polyphenylene ester, polysulfone and polyethersulfone, etc., for example, injection molding. A generally circular pressure chamber 102, discharge nozzle 103, and supply channels 104, 105 are formed in a planar surface of the baseplate 101. A hollow tube 106 passes transversely through the baseplate 101 and enters between the supply channels 104, 105 to supply ink from an outside source. The chamber 102, nozzle 103 and channels 104, 105 have coplanar parallel surfaces and the ink is in a substantially planar layer.

The supply channel 104 intersects prependicularly to the discharge nozzle 103 and the supply channel 105 connects directly to the pressure chamber 102. The supply channel 105 and the discharge nozzle 103 are connected through the pressure chamber 102. Both supply channels never increase in cross-section in the flow direction from the supply pipe 106.

A vibration plate 107 made of the same material as the baseplate 101, has a conductive film (not shown) formed thereon. A piezoelectric element 108 having electrodes (not shown) disposed on its surface is mounted to the vibration plate 107. A guide hole 109 and a fitting groove 110 formed in the baseplate 101 are used to fit the ink jet printing head to a printer body (not shown in FIG. 5).

The vibration plate 107, the baseplate 101 and the piezoelectric element 108 are compressed using heat to form an integral component, or these elements are joined together by a solvent such as methyl-ethyl-ketone (MEK) or by means of a binding agent. During the process of joining the baseplate 101, vibration plate 107 and piezoelectric element 108 together, it is important that the nozzle should not be clogged.

Ink is then supplied from an external ink tank through the supply pipe 106 and the supply channels 104, 105. Pressure chamber 102 and the nozzle 103 are filled. In the known manner, an electrical voltage applied to the electrodes of the piezoelectric element 108 effects a bending of the vibration plate 107 and as a result the volume of the pressure chamber 102 is decreased. As a result of the decreased volume of the pressure chamber 102, some ink flows backwards through the supply channels 104,105 and a small volume of ink is ejected as an ink droplet from the discharge nozzle 103 to be recorded on a medium such as paper. When the ink has been entirely ejected, the volume of the pressure chamber 102 is restored to its normal state by removal of the voltage which had been applied to the piezoelectric element 108. Ink is then supplied through the supply channel 105 by a capillary attraction of the nozzle 103. Ink is also supplied directly adjacent to the nozzle 103 through the supply channel 104 without flowing through the pressure chamber 102.

In the embodiment of FIG. 5, it is apparent that by integrally forming the nozzle 103, and the supply passages 104, 105 on a common baseplate 101 results in a simple process. The number of components in the head assembly is small and precise positioning of components at the time of assembly is unnecessary. Further, the ink supply pipe 106 may be formed integral with the body and only one ink supply pipe 106 is connected to an external ink tank which is a source of make-up ink. When, for some reason, vapor would be generated in the pressure chamber 102, ink can be discharged from the nozzle 103 through the supply channel 105 and from the pressure chamber 102 by providing pressure on the ink supply tank. Thus, the vapor in the pressure chamber 102 is discharged with the ink. The vapor is not permanently trapped. Some amount of ink flows directly to the nozzle 103 without passing through the pressure chamber 102. Thus, the embodiment in accordance with the present invention has less physical limitations on the shape than in the patent by Vernon described above.

Volume of ink flow is controlled by selecting appropriate flow impedances between the supply channels 104, 105. Concurrently with ink flow, any vapor in the supply channel 104 can be discharged. The supply channel 105, the pressure chamber 102 and the nozzle 103 are substantially aligned in the same plane and connected to one another smoothly so that there is no place for ink to stagnate. This construction easily discharges vapor from the internal chamber 102 and passages 104, 105 so as to eliminate a non-ejecting condition which results from vapor generation. Because ink will be resupplied from both supply channels 104, 105, printing speed and efficiency is greatly improved.

Figure 6:
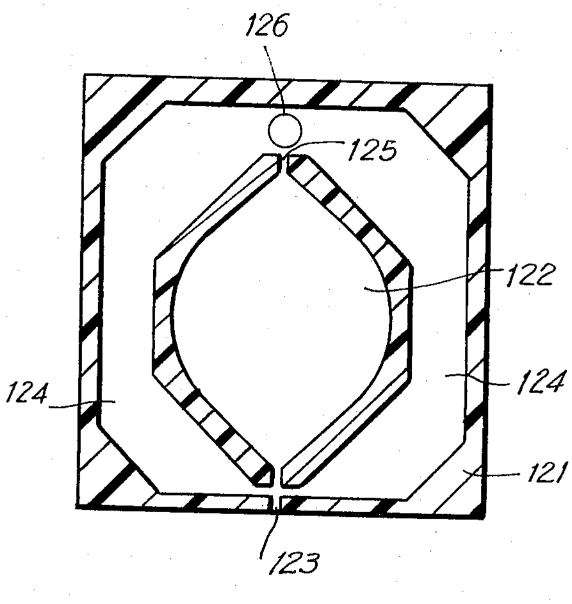
FIG. 6 is an sectional view of an alternative embodiment of an ink jet printing head in accordance with this invention.

FIG. 6 shows an alternative embodiment of an ink jet printing head in accordance with this invention. A pressure chamber 122, a nozzle 123, and supply channels 124, 125 and a supply pipe 126 are formed in the same baseplate 121. The two supply channels 124 are disposed symmetrically in relation to the nozzle 123 and are connected to the nozzle 123 substantially at right angles. Both channels 124 supply ink to the nozzle 123. Ink enters the central pressure chamber 122 through the supply channel 125 after ejection of an ink drop has occurred. The channel 125 and nozzle 123 are aligned and the supply pipe 126 enters transversely to the plane of the pressure chamber 122 and channels 124, 125 and is aligned to the channel 125 and nozzle 123. Thus, a symmetrical pattern is created. Dimensions are not critical as compared to the prior art and the flow of ink from the supply pipe 126 to the pressure chamber 122 readily purges vapor from the pressure chamber 122 if such a condition exists. As described for the embodiment above, a piezoelectric element and pressure plate oppose the pressure chamber 122 so that the volume of the pressure chamber 122 can be reduced on command in order to eject a droplet of ink from the nozzle 123.

Figure 7:
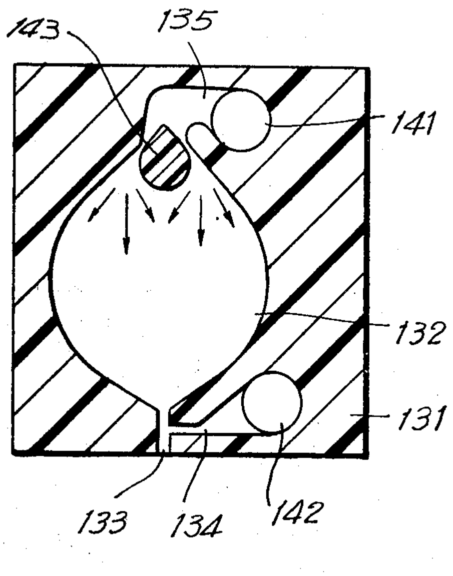
FIG. 7 is a sectional view of another alternative embodiment of an ink jet printing head in accordance with this invention.

Another alternative embodiment of an ink jet printing head in accordance with this invention is shown in FIG. 7. A pressure chamber 132 is formed in the planar surface of a plate 131 along with a discharge nozzle 133. A make-up flow of ink is furnished to the nozzle 133 by means of a supply channel 134 and supply pipe 142. The make-up channel 134 intersects the nozzle 133 at substantially right angles.

A second supply pipe 141 feeds a supply channel 135 which has its inlet to the pressure chamber 132 at an end of the chamber opposite to the nozzle 133. At the inlet to the pressure chamber 132, the supply channel 135 is divided by a generally tear-shaped dividing member 143. Ink flows smoothly and uniformly from the supply channel 135 around the dividing member 143. The tear-shape of the member 143 induces a flow which sweeps along the walls of the pressure chamber 132 as well as through the center of the pressure chamber 132. Thus, any vapor within the pressure chamber 132 is discharged through the nozzle 133. Both supply pipes 141, 142 are connected by tubing (not shown) to an external ink tank (not shown). When only the supply pipe 141 is used, any vapor within the pressure chamber 132 is more easily discharged than when both supply pipes 141, 142 are used.

Figure 8:
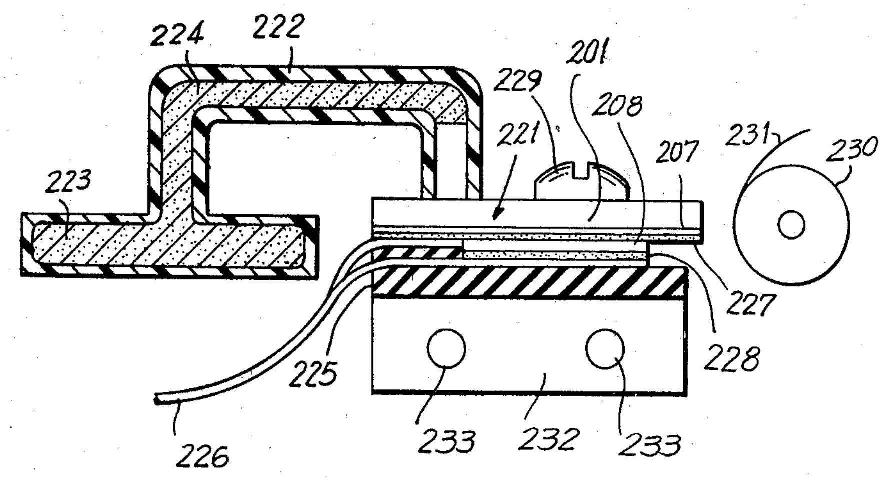
FIG. 8 is a semi-schematic side elevational view in section of a printer including an ink jet printing head in accordance with this invention.

Installation of an ink jet printing head in accordance with this invention into a printer mechanism is shown in FIG. 8. The ink jet printing head 221 is the printer head described in relation to FIG. 5. An ink tank 223 made of vinylidene chloride or polyethylene is connected to the printing head 221 by means of a pipe 222 made of vinyl chloride. The printing head 221 is comprised of the piezoelectric element 208 sandwiched between electrodes 227,228 and mounted to a vibration plate 207 as described with relation to FIG. 5. The printing head is mounted on a rubber mat 225 which in turn is mounted on a carriage 232.

The carriage 232 with the printing head 221 affixed thereto translates on guide shafts 233 which extend transversely from the plane of the paper. The printing head is held to the carriage by means of a lock nut 229 with the nozzle (not shown in FIG. 8) opposing a web of paper 231 which passes around a paper feed roller 230 in the known manner.

The carriage 232 reciprocates in the direction perpendicular to the plane of the paper of FIG. 8 along the guide shafts 233 in the printing mechanism Concurrently with the reciprocating movement, the recording paper 231 is fed by the paper feed roller 230 by a distance equalling the pitch distance between dots in the printed characters. An eject signal is transmitted from a control circuit (not shown) to the electrode 228 and the electrode 227 on the vibration plate 207 when the carriage is in position for printing the next dot on the paper 231. The electrical signals are fed through a flexible wiring harness 226. When the signal is received and deflects the piezoelectric element 208, a dot of ink 224 in the form of a droplet is ejected from the nozzle and falls on the recording paper 231. By relative movements of the carriage 232 and the paper feed roller 230, ink droplets are ejected and dots are printed on the recording paper 231 by impingement of the ink droplet in a manner similar to that used in scanning lines of a television picture.

When the ink in the ink tank 223 is consumed, the lock nut 229 is loosened and the head 221 is changed along with the ink tank 223 and the supply pipe 222 as a unit. This method has an advantage in that air is not drawn into the ink at the connection of the ink tank 223 and the head 221. Nozzles which become clogged by solidification of ink can easily be exchanged. Spring means may be used to fix the printing head 221 on the carriage 232 in place of the lock nut 229.

The response speed of ink-on-demand type ink jet printers depends on the time for supplying ink from the supply tank to the pressure chamber. This is the speed determining factor because make-up time is longer than the time required for ejecting a droplet of ink. In the printing heads in accordance with this invention, ink is supplied from first and second supply channels thereby shortening the time to make up ink after ejection of a droplet. In a printer wherein scanning is done by a single nozzle as described above, the rapid response of the printing heads in accordance with this invention allows for the maintenance of a desired printing speed. Additionally, reliability is improved because vapor is easily discharged from the pressure chamber. This purging of vapor from the pressure chamber is enhanced by the design which provides make-up ink at a position on the pressure chamber opposite to the discharge nozzle. Having the nozzle, pressure chamber and supply channel in the same plane also enhances purging action of the incoming ink in expelling vapors.

The pressure chamber, nozzle and supply channel in each embodiment in accordance with this invention are formed integrally with a single baseplate, whereby positioning of the elements relative to each other at final assembly is simple and the number of independent components is small so that an inexpensive ink jet printing head is obtained.

Injection molding of the printing head makes for inexpensive mass production. The head can be exchanged concurrently with the ink tank, whereby air is not permitted into the ink. This differs from an apparatus wherein only the ink tank is exchangeable. In alternative embodiments of this invention the printing head for the ink jet printer may be produced by hot pressing as compared to the injection molding mentioned relative to the embodiments already discussed above. It should also be understood that in an alternative embodiment, in accordance with this invention, a plurality of nozzles may be formed on the same plane. In another alternative embodiment, the pressure chamber, nozzle and supply passages may be formed on the vibration plate.

In the described embodiments, the vibration plate and baseplate are formed of synthetic resin. Generally, the modulus of longitudinal elasticity for synthetic resins is low, such that bending perpendicular to the plane surface is small as a result of radial displacement of the piezoelectric member. To improve on this condition, materials of high elastic modulus may be used for the vibration plate and the baseplate. Also, high molecule piezoelectric material, that is, high polymer piezoelectric material such as polyvinylidene fluoride, may be used to serve both as the vibration plate and the piezoelectric element.

The ink jet printing heads in accordance with this invention have the characteristic that a second supply channel is provided in addition to a first supply channel integrally in a plane as part of a single baseplate. The printing heads in accordance with this invention have many advantages such as improvement in response speed, ease in fabricating parts and assembly, fewer parts and an ability of the assembled unit to discharge vapor from the pressure chamber. The pressure chamber, nozzle, supply channel and supply pipe are formed as an integral member so as to decrease the number of parts and reduce the time required for assembly. Further, as a printing head produced at low cost, in printers where the number of nozzles is small, it is advantageous that the printing head is exchangeable concurrently with the ink tank when either the ink in the ink tank is consumed or the head has broken down. Exchanging the head concurrently with the ink tank prevents air from entering into the ink during assembly and accordingly reliability of printing is increased.

The printing head in accordance with this invention can be applied to facsimile printers, copying presses, plotters and the like.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also understood that the following claims are intended to cover all of the generic and specific features of the invention herein described and all statements of the scope of the invention which, as a matter of language, might be said to fall therebetween.

What is claimed is:

1. An ink jet printer head for an ink-on-demand jet type printer, comprising:

a baseplate;

a vibration plate fixedly abutting said baseplate;

a pressure chamber for containing ink having substantially parallel opposed walls, one said parallel wall being a portion of said baseplate, the other said parallel wall being a portion of said vibration plate;

a piezoelectric element attached to said vibration plate, electrical energization of said piezoelectric element causing said parallel wall of said vibration plate to deflect, internal volume of said pressure chamber being reduced by said vibration plate deflection;

an ink nozzle communicating between said pressure chamber and an external surface of said ink jet print head, wherethrough ink from said chamber is ejected;

a first ink supply channel communicating between a supply of ink and said pressure chamber, the inlet of said first ink supply channel to said pressure chamber being opposite to said ink nozzle;

one wall of said first supply channel and said ink nozzle being substantially coplanar with one said parallel wall of said pressure chamber, another wall of said first supply channel and said ink nozzle being substantially coplanar with the other parallel wall of said pressure chamber;

a second ink supply channel communicating between said supply of ink and said ink nozzle;

said second ink supply channel has one wall substantially coplanar with one said parallel wall of said pressure chamber, another wall of said second ink supply channel being substantially coplanar with the other parallel wall of said pressure chamber.

2. An ink jet printer head as claimed in claim 1, wherein said ink nozzle, supply channels, and pressure chamber are recessed into said baseplate.

3. An ink jet printer head as claimed in claim 1 or 2, wherein said pressure chamber and said piezoelectric element are substantially circular and opposed, said vibration plate being interposed between said piezoelectric element and said pressure chamber.

4. An ink jet printer head as claimed in claim 3, wherein the diameter of said piezoelectric element substantially equals the diameter of said pressure chamber.

5. An ink jet printer head as claimed in claim 1 or 2, wherein said supply channels narrow in the flow direction from said supply pipe.

6. An ink jet printer head as claimed in claim 1 or 2, wherein said second ink supply channel enters said nozzle at substantially a right angle.

7. An ink jet printer head as claimed in claim 1, wherein said supply channels connect to said supply of ink through a common supply pipe.

8. An ink jet printer head as claimed in claim 7, wherein said supply pipe enters said supply channels transversely.

9. An ink jet printer head as claimed in claim 1, and further comprising a third ink supply channel, said third supply channel communicating with said ink nozzle at an inlet opposite to the inlet from said second ink supply channel to said nozzle.

10. An ink jet printer head as claimed in claim 9, wherein said third ink supply channel is substantially coplanar with said second ink supply channel and symmetrically arranged relative to said second ink supply channel between said connection to said ink supply and said connection to said ink nozzle.

11. An ink jet printer head as claimed in claim 10, wherein ink from said ink supply is supplied to said second and third ink supply channels at a position opposed to said ink nozzle.

12. An ink jet printer head as claimed in claim 1 or 9, and further comprising a dividing element at the entrance to said pressure chamber from said first ink supply channel, whereby ink flowing into said pressure chamber from said first ink supply channel is divided into two streams.

13. An ink jet printer head as claimed in claim 1, 2, 9, or 12, wherein said vibration plate and said baseplate are formed of a synthetic resin.

14. An ink jet printer head as claimed in claim 13, wherein said synthetic resin has a high modulus of elasticity.

15. An ink jet printer head as claimed in claim 12, wherein said pressure chamber is generally circular and wherein said dividing element is tear drop shaped, said two streams entering said pressure chamber along the sidewalls of said pressure chamber, whereby stagnation of ink in said pressure chamber is prevented.

16. An ink jet printing head for an ink-on-demand jet type printer, comprising:

a baseplate;

a vibration plate fixedly abutting said baseplate;

a pressure chamber for containing ink having substantially parallel opposed walls, one said parallel wall being a portion of said baseplate, the other said parallel wall being a portion of said vibration plate;

a piezoelectric element attached to said vibration plate, electrical energization of said piezoelectric element causing said parallel wall of said vibration plate to deflect, the internal volume of said pressure chamber being reduced by said vibration plate deflection;

an ink nozzle communicating between said pressure chamber and an external surface of said ink jet print head, wherethrough ink from said chamber is ejected;

an ink supply channel communicating between a supply of ink and said pressure chamber, the inlet of said supply channel to said pressure chamber being opposite to said ink nozzle;

a dividing element at the entrance to said pressure chamber from said ink supply channel, ink flowing into said pressure chamber from said ink supply channel being divided into two streams by said dividing element.

* * * * *